United States Patent
Wu et al.

(10) Patent No.: US 9,110,637 B2
(45) Date of Patent: Aug. 18, 2015

(54) ELECTRONIC DEVICE

(71) Applicant: HON HAI PRECISION INDUSTRY CO., LTD., New Taipei (TW)

(72) Inventors: Kuo-Hsiang Wu, New Taipei (TW); Kuan-Yu Chen, New Taipei, PA (US)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/280,229

(22) Filed: May 16, 2014

(65) Prior Publication Data

US 2014/0340830 A1 Nov. 20, 2014

(30) Foreign Application Priority Data

May 17, 2013 (TW) .............................. 102117663 A

(51) Int. Cl.
*H05K 5/00* (2006.01)
*G06F 1/16* (2006.01)

(52) U.S. Cl.
CPC .............. *G06F 1/1679* (2013.01); *G06F 1/162* (2013.01)

(58) Field of Classification Search
CPC ... G06F 1/1637; G06F 1/1616; G06F 1/1681; F16M 2200/08; F16M 11/00; F16M 11/04; H05K 5/0234
See application file for complete search history.

(56) References Cited

U.S. PATENT DOCUMENTS

| | | | |
|---|---|---|---|
| 2006/0145046 A1* | 7/2006 | Liou et al. ...................... | 248/455 |
| 2007/0030634 A1* | 2/2007 | Maskatia ........................ | 361/683 |
| 2009/0040701 A1* | 2/2009 | Lin ................................ | 361/681 |
| 2010/0226088 A1* | 9/2010 | Huang ....................... | 361/679.48 |
| 2011/0108696 A1* | 5/2011 | Ye .................................. | 248/371 |
| 2013/0128443 A1* | 5/2013 | Tseng et al. .............. | 361/679.12 |
| 2014/0139982 A1* | 5/2014 | Kuo et al. ................ | 361/679.01 |
| 2015/0002998 A1* | 1/2015 | Arima et al. ............. | 361/679.27 |

* cited by examiner

*Primary Examiner* — Robert J Hoffberg
*Assistant Examiner* — Hung Dang
(74) *Attorney, Agent, or Firm* — Novak Druce Connolly Bove + Quigg LLP

(57) ABSTRACT

An electronic device comprises a base, a display body, and a pivot mechanism. The pivot mechanism rotatably connects to the base and the display body to allow the display body to rotate relative to the base via the pivot mechanism. When one edge of the display body rotates to rest on the base, the pivot mechanism, the base, and the display body form a triangle to make the display body firmly supported by the pivot mechanism on the base.

8 Claims, 6 Drawing Sheets

ELECTRONIC DEVICE

FIELD

The present disclosure relates to an electronic device.

BACKGROUND

A notebook computer includes a base, a display, and a pivot mechanism. The pivot mechanism is connected between the base and the display. The display can be a touch screen to sense touch operations.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Figure 1:
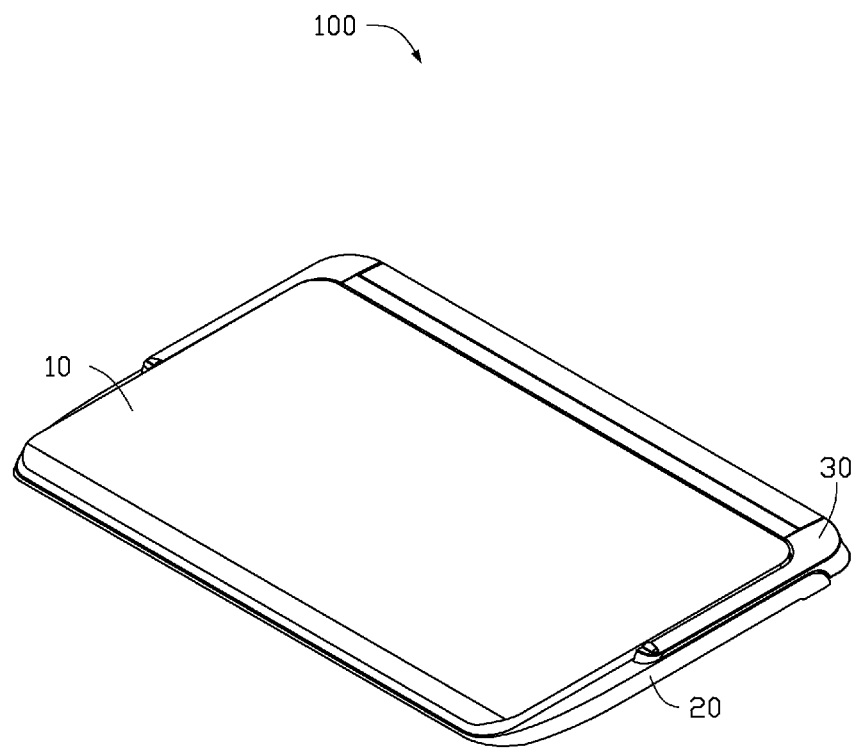
FIG. 1 is an isometric view of an embodiment of an electronic device in a closed state.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Reference will be made to the drawings to describe various embodiments.

Referring to FIGS. 1-4, an electronic device 100 can include a display body 10, a base 20, and a pivot mechanism 30. The pivot mechanism 30 rotatably connects the display body 10 to the base 20. The display body 10 can include a touch screen 11. The display body 10 is capable of rotating toward or away from the base 20.

Referring to FIG. 1, the electronic device 100 is in a closed state, and the display body 10 covers the base 20. When the display body 10 is rotated away from the base 20 via the pivot mechanism 30, the electronic device 100 can be switched to other states (as shown in FIGS. 2-4).

Figure 2:
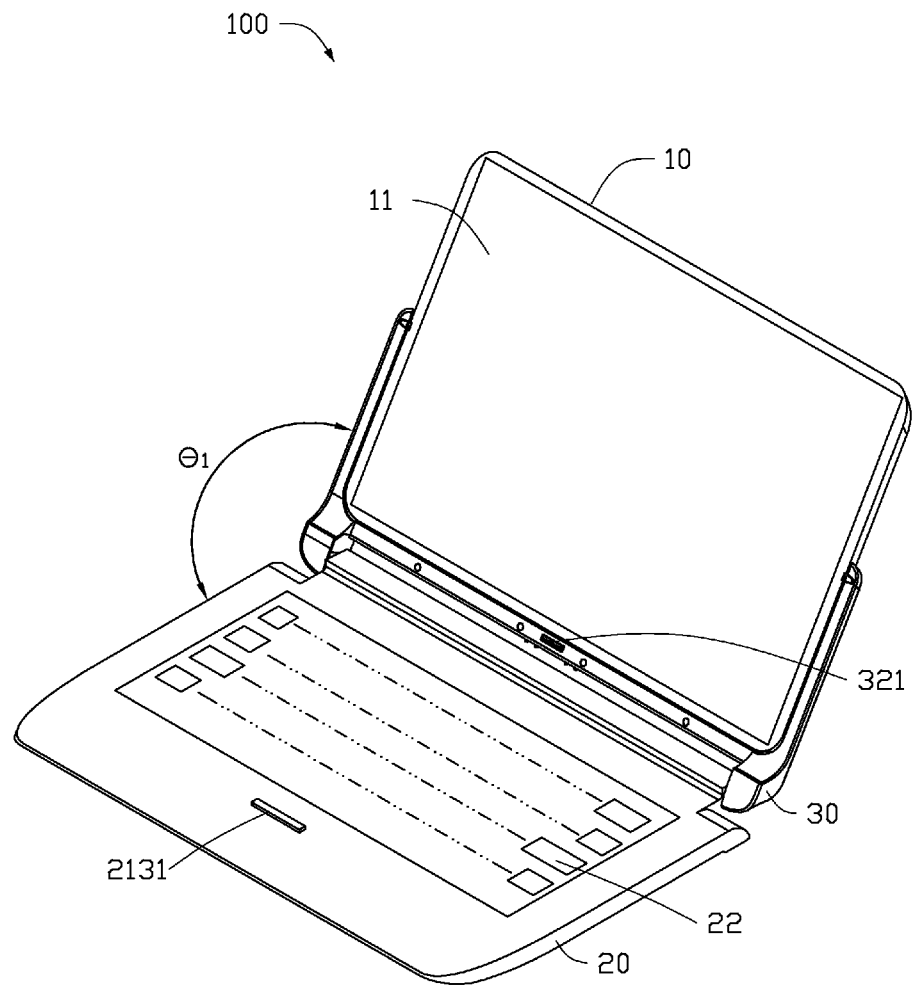
FIG. 2 is an isometric view of the electronic device of FIG. 1, showing the electronic device in a first state.

As illustrated in FIG. 2, the display body 10 can rotate to a first angle $\theta_1$ relative to the base 20 to switch the electronic device 100 from the closed state to a first state.

Figure 3:
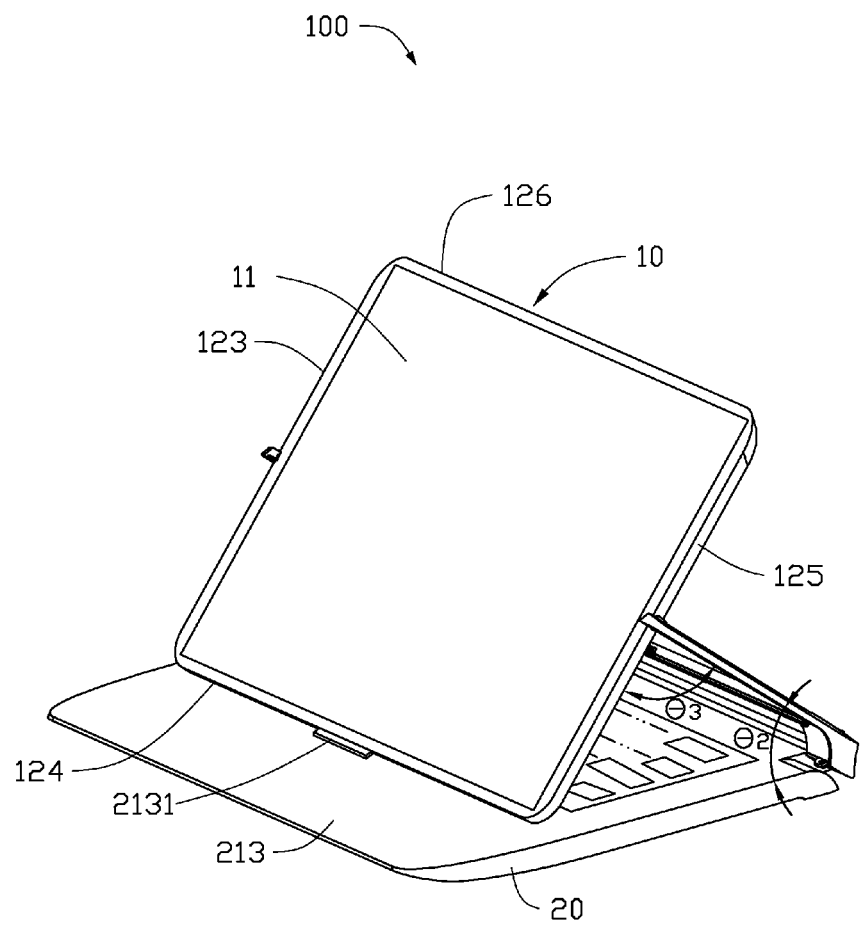
FIG. 3 is an isometric view of the electronic device of FIG. 1, showing the electronic device in a second state.

As illustrated in FIG. 3, the pivot mechanism 30 can rotate to a second angle $\theta_2$ relative to the base 20, and the display body 10 can rotate to a third angle $\theta_3$ relative to the pivot mechanism 30. At this time, an edge of the display body 10 is supported on the base 20, and the electronic device 100 is switched to a second state.

Figure 4:
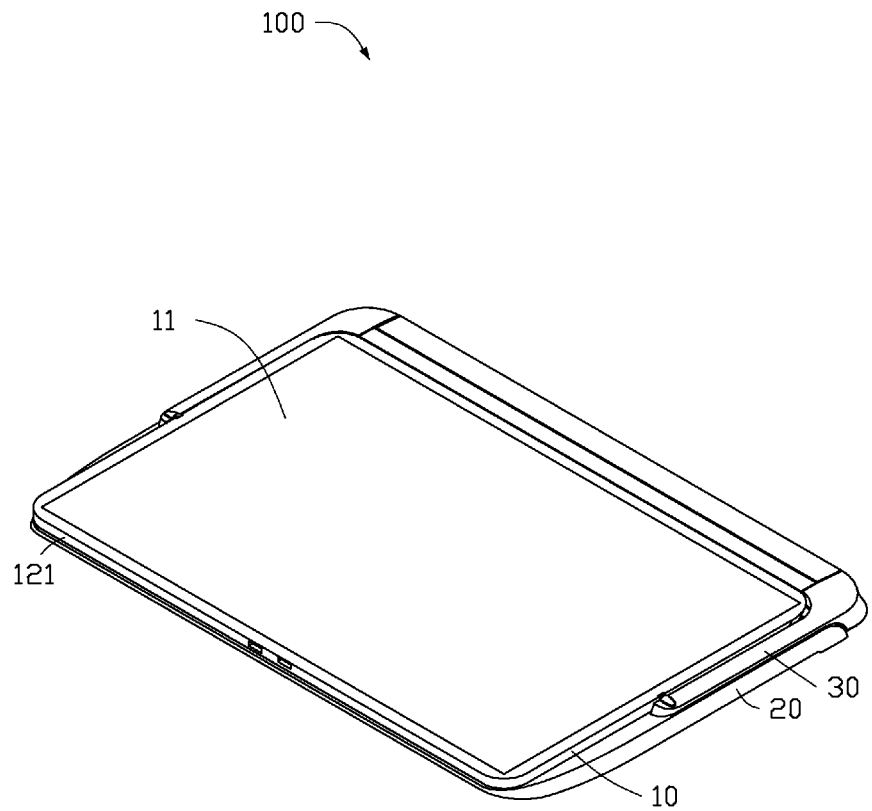
FIG. 4 is an isometric view of the electronic device of FIG. 1, showing the electronic device in a third state.

As illustrated in FIG. 4, the display body 10 can further rotate relative to the pivot mechanism 30, and the pivot mechanism 30 can further rotate relative to the base 20, to make the display body 10 cover the base 20, such that the touch screen 11 faces a user. At this time, the electronic device 100 is switched to a third state.

Figure 5:
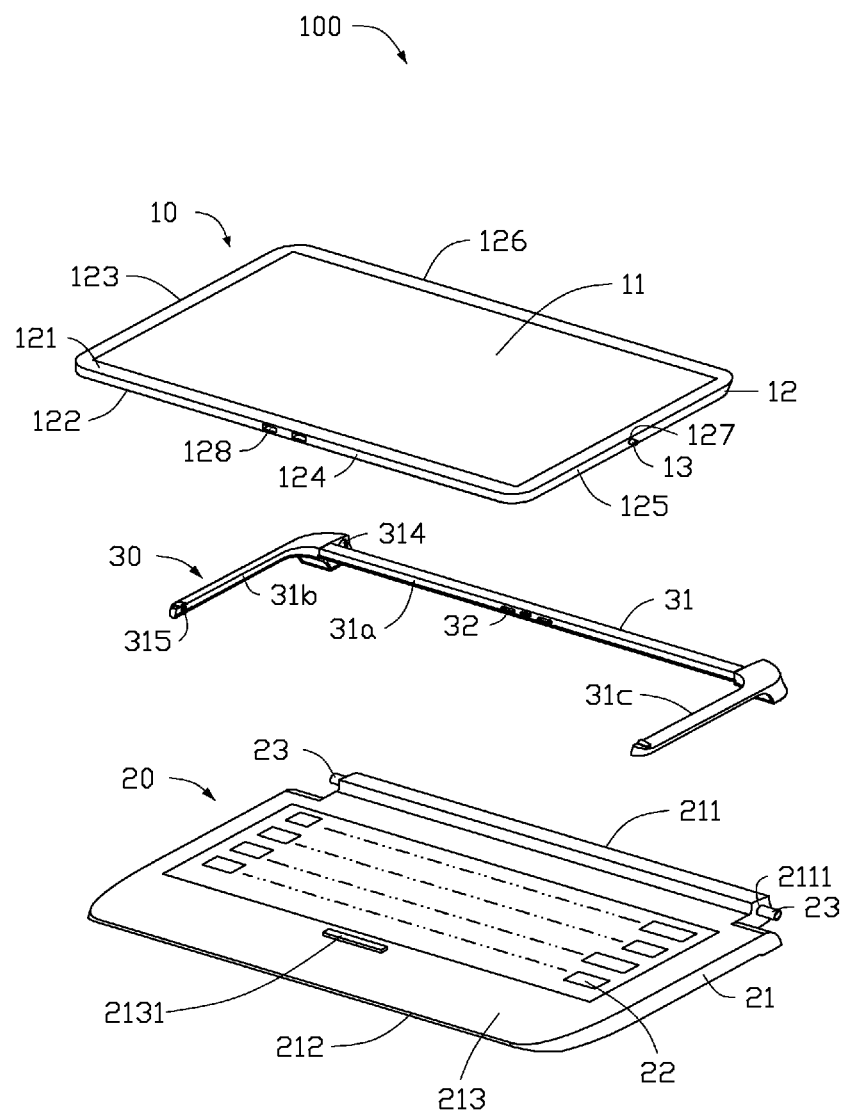
FIG. 5 is an exploded view of the electronic device of FIG. 4.
Figure 6:
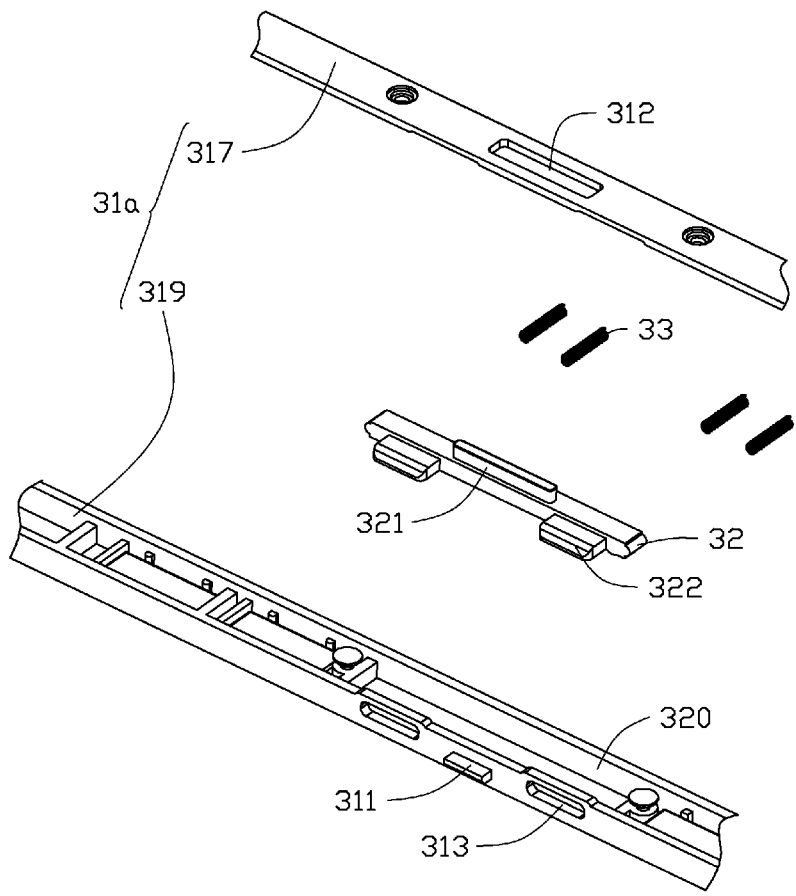
FIG. 6 is a partial exploded view of a frame and a latching member of FIG. 5.

Referring to FIGS. 5 and 6, the display body 10 is substantially rectangular. The display body 10 can include a first cover 12. The first cover 12 can include a front surface 121, a back surface 122, a first side surface 123, a second side surface 124, a third side surface 125, and a fourth side surface 126. The front surface 121 is opposite to the back surface 122. The first side surface 123, the second side surface 124, the third side surface 125, and the fourth side surface 126 are connected between the front surface 121 and the back surface 122. The touch screen 11 is arranged on the front surface 121. A first receiving hole 127 is defined in substantially central portions of the first side surface 123 and the third side surface 125. Two grooves 128 are defined in a substantially central portion of the second side surface 124. In one embodiment, the display body 10 can include two first pivots 13, where one first pivot 13 protrudes out of the first receiving hole 127 of the first side surface 123, and the other first pivot 13 protrudes out of the first receiving hole 127 of the third side surface 125. The two first pivots 13 are hollow to receive a cable electrically connected between the display body 10 and the base 20.

The base 20 can include a second cover 21 and a keyboard 22. The keyboard 22 can be exposed out of the second cover 21. The second cover 21 can include a first side portion 211, a second side portion 212, and an upper surface 213. The upper surface 213 can be connected between the first side portion 211 and the second side portion 212. The first side portion 211 can be opposite to the second side portion 212. The keyboard 22 is exposed out of the second cover 21 via the upper surface 213. A resisting portion 2131 is arranged on the upper surface 213 and located adjacent to the second side portion 212. In one embodiment, the resisting portion 2131 is a strip protruding from the upper surface 213. Two second receiving holes 2111 are defined in two respective opposite ends of the first side portion 211. In one embodiment, the base 20 can include two second pivots 23, where one second pivot 23 protrudes out of the second receiving hole 2111 of one end of the first side portion 211, and the other second pivot 23 protrudes out of the second receiving hole 2111 of the other end of the first side portion 211. The two second pivots 23 are hollow to receive a cable connected between the display body 10 and the base 20.

The pivot mechanism 30 can include a frame 31, a latching member 32, and a plurality of elastic elements 33. The frame 31 can include a first side frame 31a, a second side frame 31b, and a third side frame 31c.

Referring to FIG. 6, the first side frame 31a can include a cover portion 317 and a bottom portion 319. A first through hole 312 is defined in the cover portion 317. A limiting portion 311 protrudes from a substantially middle portion of a front surface of the bottom portion 319. Two second through holes 313 are defined adjacent to respective opposite ends of the limiting portion 311. The bottom portion 319 defines a receiving groove 320 to receive the latching member 32 therein. The limiting portion 311 can be a rib to limit a rotation angle of the display body 10 relative to the pivot mechanism 30. In one embodiment, a range of rotation of the display body 10 is about 180 degrees. The two second through holes 313 are defined adjacent to two respective opposite ends of the limiting portion 311. The two second through holes 313 correspond to the two grooves 128. The second side frame 31b and the third side frame 31c connect to two respective opposite end portions of the first side frame 31a. A first pivoting hole 314 is defined in a portion of each of the second side frame 31b and the third side frame 31c. The first pivoting holes 314 are located adjacent to the first side frame 31a. The two second pivots 23 are inserted into the corresponding two first pivoting holes 314 to allow the pivoting mechanism 30 to rotate relative to the base 20. A second pivoting hole 315 is defined in distal end portions of the second side frame 31b and the third side frame 31c. The two first pivots 13 are inserted into the corresponding two second pivoting holes 315, to allow the display body 10 to rotate relative to the pivoting mechanism 30.

The latching member 32 is received in the receiving groove 320. The latching member 32 can include a button 321 and two blocks 322. The button 321 can protrude out of the first side frame 31a via the first through hole 312 of the cover portion 317. The two blocks 322 can protrude out of the first side frame 31a via the corresponding second through holes 313 and latch into the corresponding two grooves 128. The button 321 can be pushed to drive the two blocks 322 to retract into the first side frame 31a.

The elastic elements 33 can be compressed between a back wall of the latching member 32 and a back wall of the bottom portion 319. When the button 321 is pressed by an external force to slide the latching member 32 toward the back wall of the bottom portion 319, the elastic elements 33 are compressed, and the two blocks 322 are retracted into the first side frame 31a. When the external force applied to the button 321 is released, the elastic elements 33 restore to slide the latching member 32 toward the second through holes 313, and the two blocks 322 protrude out of the first side frame 31a via the second through holes 313.

In assembly, the two second pivots 23 of the base 20 are inserted into the two first pivoting holes 314 of the pivot mechanism 30, so that the pivot mechanism 30 can rotate relative to the base 20. The two first pivots 13 of the display body 10 are inserted into the two second pivoting holes 315 of the pivot mechanism 30, so that the display body 10 can rotate relative to the pivot mechanism 30. The two blocks 322 of the latching member 32 latch into the two grooves 128 of the display body 10 to fix the display body 10 to the pivot mechanism 30.

Referring to FIGS. 1-6, to switch the electronic device 100 from the closed state to the first state, the display body 10 is rotated to the first angle $\theta_1$ relative to the base 20 while the display body 10 is fixed to the latching member 32. To switch the electronic device 100 to the second state, the button 321 is pressed to release the display body 10 from the latching member 32. The pivot mechanism 30 is rotated to the second angle $\theta_2$ relative to the base 20, and the display body 10 is rotated to the third angle $\theta_3$ relative to the pivot mechanism 30, to make the second side surface 124 of the display body 10 resist against the resisting portion 2131 and be supported on the base 20. In the second state, the pivot mechanism 30, the base 20, and the display body 10 cooperatively form a triangle. To switch the electronic device 100 to the third state, the display body 10 and the pivot mechanism 30 are rotated to be substantially parallel to the base 20.

In another embodiment, a plurality of resisting portions 2131 can be arranged on the base 20 to support the display body 10 on the base 20 at different angles.

In summary, because the pivot mechanism 30 is rotatably connected to the base 20 and the display body 10, the electronic device 100 can be switched to different states. In the second state, because the pivot mechanism 30, the base 20, and the display body 10 cooperatively form a triangle, the display body 10 can be supported on the base 20 firmly. Thus, the display portion 10 of the electronic device 100 will not sway when the screen 11 is touched.

It is to be understood that even though numerous characteristics and advantages of the present embodiments have been set forth in the foregoing description, with details of the structures and functions of the embodiments, the disclosure is illustrative only; and changes may be in detail, especially in the matters of arrangement of parts within the principles of the embodiments to the full extent indicated by the broad general meaning of the terms in which the appended claims are expressed.

What is claimed is:

1. An electronic device, comprising:
  a base;
  a display body; and
  a pivot mechanism rotatably connected to the base and the display body to make the display body to rotate relative to the base via the pivot mechanism, the pivot mechanism comprises:
    a frame, the frame comprises:
      a first side frame having a cover portion and a bottom portion, a first through hole is defined in the cover portion, a limiting portion and two second through hole are arranged at a middle portion of the bottom portion, the first through hole is defined at one side of the first side frame facing the base, the two second through holes are respectively defined at the two opposite ends of the limiting portion corresponding to two grooves defined at the display body;
      a second side frame; and
      a third side frame, the second side frame and the third side frame connect to the two opposite ends of the first side frame, and a first pivoting hole is defined in each of the second side frame and the third side frame adjacent to the first side frame; and
    a latching member arranged on the frame, and the latching member latches with the display body to fix the display body when the display body resists the base, the latching member is received in a receiving groove defined in the bottom portion and comprises a button and two blocks, the button is exposed out of the first side frame via the first through hole, the two blocks respectively expose out of the first side frame via the two second through holes to latch with the two grooves, the button is configured to slide relative to the first through hole to drive the two blocks to be hidden in the first side frame,
  wherein when one side of the display body is rotated to resist the base, the pivot mechanism, the base and the display body cooperatively form a triangle to enable the display body to be firmly supported by the pivot mechanism and the base.

2. The electronic device of claim 1, wherein the base comprises a first side portion and a second side portion opposite to the first side portion, and the display body resists the base between the first side portion and the second side portion.

3. The electronic device of claim 2, wherein a resisting portion is arranged between the first side portion and the second side portion, and the display body resists the resisting portion.

4. The electronic device of claim 1, wherein the pivot mechanism further comprises a plurality of elastic elements arranged between the frame and the latching member, the elastic elements support the latching member; when the button is operated by an external force to slide relative to the first through hole, the plurality of elastic elements are compressed to have certain of deformation and the two blocks are hidden in the first side frame; when the external force applied to the button is eliminated, the deformation of the elastic elements recovers to drive the button to return to an original position to make the two blocks expose out of the first side frame via the two second through holes.

5. An electronic device, comprising:
   a base;
   a display body; and
   a pivot mechanism rotatably connected to one side of the base and rotatably connected to a central portion of the display body, the pivot mechanism comprises:
      a frame, the frame comprises:
         a first side frame having a cover portion and a bottom portion, a first through hole is defined in the cover portion, a limiting portion and two second through hole are arranged at a middle portion of the bottom portion, the first through hole is defined at one side of the first side frame facing the base, the two second through holes are respectively defined at the two opposite ends of the limiting portion corresponding to two grooves defined at the display body;
         a second side frame; and
         a third side frame, the second side frame and the third side frame connect to the two opposite ends of the first side frame, and a first pivoting hole is defined in each of the second side frame and the third side frame adjacent to the first side frame; and
      a latching member arranged on the frame, and when the display body resists the base the latching member latches with the display body to fix the display body, the latching member is received in a receiving groove defined in the bottom portion and comprises a button and two blocks, the button is exposed out of the first side frame via the first through hole, the two blocks respectively expose out of the first side frame via the two second through holes to latch with the two grooves, the button is configured to slide relative to the first through hole to drive the two blocks to be hidden in the first side frame,
   wherein when one side of the display body is rotated to resist the base, the pivot mechanism, the base and the display body cooperatively form a triangle to make the display body to be firmly supported by the pivot mechanism and the base.

6. The electronic device of claim 5, wherein the base comprises a first side portion and a second side portion opposite to the first side portion, and the display body resists the base between the first side portion and the second side portion.

7. The electronic device of claim 6, wherein a resisting portion is arranged between the first side portion and the second side portion, and the display body resists the resisting portion.

8. The electronic device of claim 5, wherein the pivot mechanism further comprises a plurality of elastic elements arranged between the frame and the latching member, the elastic elements support the latching member; when the button is operated by an external force to slide relative to the first through hole, the plurality of elastic elements are compressed to have certain of deformation and the two blocks are hidden in the first side frame; when the external force applied to the button is eliminated, the deformation of the elastic elements recovers to drive the button to return to an original position to make the two blocks expose out of the first side frame via the two second through holes.

* * * * *